UNITED STATES PATENT OFFICE.

BIRGER FJELD HALVORSEN, OF CHRISTIANIA, NORWAY, ASSIGNOR TO NORSK HYDRO-ELEKTRISK KVAELSTOFAKTIESELSKAB, OF CHRISTIANIA, NORWAY.

METHOD OF ABSORBING OXIDS OF NITROGEN.

No. 910,530.      Specification of Letters Patent.      Patented Jan. 26, 1909.

Application filed March 19, 1908. Serial No. 422,129.

*To all whom it may concern:*

Be it known that I, BIRGER FJELD HALVORSEN, a subject of the King of Norway, residing at Christiania, Norway, have invented certain new and useful Improvements in Methods of Absorbing Oxids of Nitrogen; and I do hereby declare the following to be a a full, clear, and exact description of the invention, such as will enable others skilled in the art to which it appertains to make and use the same.

My invention relates to the utilization of nitrous gases and consists in a method of absorbing nitrous gases substantially for the purpose of producing nitric acid and pure nitrites.

It is a well known fact that in treating nitrous gases, such as are, for instance, obtained by the combustion of atmospheric nitrogen by means of an electric arc, with alkaline absorbing agents, a mixture of nitrate and nitrite is generally obtained. Such mixed products cannot be directly utilized in the arts, and attempts have therefore been made to avoid said drawback by the use of special measures.

According to the present invention the result aimed at is attained by utilizing the gases in such a manner that they are first treated with water to obtain nitric acid, according to the following reactions:

$$N_2O_5 + H_2O = 2HNO_3;$$
$$2NO_2 + H_2O + O = 2HNO_3;$$
$$2NO + H_2O + 3O = 2HNO_3;$$

and that the highly diluted remaining gases are thereupon caused to be absorbed in caustic alkalies or carbonates of alkali; or in caustic alkalies and carbonates of alkali; for it appears that such diluted gases principally or exclusively contain nitrogen in the lower stages of oxidation, and when absorbed by the said absorbing agents give pure nitrites. The reaction with caustic soda may be expressed as follows—

$$NO + NO_2 + 2NaOH = 2NaNO_2 + H_2O,$$

and with a carbonate of the alkalies, as sodium carbonate, the reaction may be expressed as follows—

$$NO + NO_2 + Na_2CO_3 = 2NaNO_2 + CO_2.$$

In this manner pure nitric acid is obtained from the nitrous gases in the first part of the absorbing process, and in the last part thereof substantially pure nitrites are obtained.

I claim—

1. The method of absorbing nitrous gases, comprising first treating the gas with water and conducting the gases resulting therefrom into an alkaline absorbent.

2. The method of absorbing nitrous gases, comprising first treating said gases with water and conducting the resulting gases into an absorbent containing caustic alkali.

3. The method of absorbing nitrous gases, comprising first treating said gases with water and conducting the resulting gases into an absorbent containing caustic alkali and a carbonate of the alkalies.

In testimony that I claim the foregoing as my invention, I have signed my name in presence of two subscribing witnesses.

BIRGER FJELD HALVORSEN.

Witnesses:
    HENRY BORDEWICH,
    MICHAEL ALGER.